P. TORCHIO & H. R. WOODROW.
PROTECTIVE DEVICE FOR BUS BAR CIRCUITS.
APPLICATION FILED APR. 24, 1914.
1,133,338.
Patented Mar. 30, 1915.
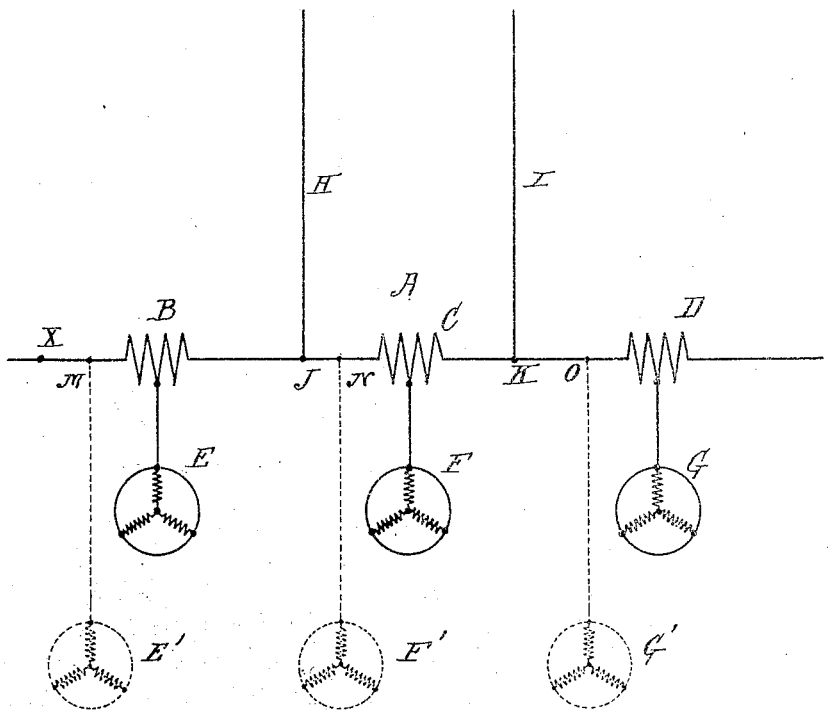

UNITED STATES PATENT OFFICE.

PHILIP TORCHIO AND HARRY RAY WOODROW, OF NEW YORK, N. Y.

PROTECTIVE DEVICE FOR BUS-BAR CIRCUITS.

1,133,338.

Specification of Letters Patent. Patented Mar. 30, 1915.

Application filed April 24, 1914. Serial No. 834,067.

*To all whom it may concern:*

Be it known that we, PHILIP TORCHIO and HARRY R. WOODROW, citizens of the United States, residing at New York, in the county of New York and State of New York, have invented a certain new and useful Improvement in Protective Devices for Bus-Bar Circuits, of which the following is a specification.

The invention is a protective device for bus-bar circuits, whereby the total current passing upon the circuit, by reason of a fault—ground, short circuit, or the like—therein is limited, and whereby the voltage at certain portions of the circuit (to which branch or service leads are connected) is maintained at one hundred per cent. of that delivered by the generators despite the occurrence of said fault.

The accompanying drawing is an electrical diagram symbolically illustrating our invention.

A is a bus-bar circuit, in which three reactance coils B, C, D are shown connected in series.

E, F, G are alternating current generators respectively connected to said reactance coils at taps preferably midway between the coil terminals.

H and I are branch leads connected to the circuit A at points J, K, respectively between coils B, C and C, D. Under normal conditions, the whole current from the generators is on the circuit A and will be delivered to branches H, I. By reason of the above construction, if a fault occurs in the circuit A—short circuit or ground, for example, say at X—nevertheless the voltage delivered to the branches H, I will remain as before at one hundred per cent.

For purposes of explanation, assume that the alternating current generators instead of being connected to taps on the reactance coils are connected to points on the circuit A outside of said reactance coils. Thus the generators E', F', G', dotted lines, are shown connected in the drawing to circuit A at points M, N, O. Let the fault occur at X. The drop in potential from E' to X will result in the delivery of a current corresponding to say ten times full load—from F' to X, by reason of the presence of coil B the current may be say five times full load—from G' to X, the two coils B, C now intervening, the current may be say three times full load. Hence the total current delivered to circuit A corresponds to (ten plus five plus three) eighteen times full load, and the results may prove disastrous. Furthermore, the voltage at the branch leads can never reach one hundred per cent. owing to the alternate path to the fault X, and may be much less. With our construction, the current from generator E passes through the left hand section of the reactance coil B in going to the fault X, and inductively adds in the right hand section of coil B a voltage equivalent to the voltage drop in generator E. Hence the voltage on the remaining bus section J, K, etc., remain one hundred per cent. and the power is supplied to circuits H, I, etc., from generators F, G, etc., at one hundred per cent. voltage. Hence no change in the voltage on circuit A between reactance coils B, C, D, etc., occurs, and from this part of the circuit one hundred per cent. voltage is delivered to branch leads H, I, etc. An indefinite number of generators and coils can be connected in circuit A, as described, the voltage on the undamaged sections always remaining at one hundred per cent.; and the total current passing into the short circuit A corresponding to but ten times instead of eighteen times full load.

We claim:

1. In combination with a plurality of alternating current generators, a circuit including in series reactance coils equal in number to said generators or group of generators; the said coils being tapped and connected at said taps to corresponding terminals of said generators or group of generators.

2. In combination with a plurality of alternating current generators, a circuit including in series reactance coils equal in number to said generators or group of generators; the said coils being tapped and connected at said taps to corresponding terminals of said generators or group of generators, and branch leads connected to said circuit at points between said coils.

In testimony whereof we have affixed our signatures in presence of two witnesses.

PHILIP TORCHIO.
HARRY RAY WOODROW.

Witnesses:
A. H. LAWTON,
J. F. SINCLAIR.